Aug. 2, 1932.  H. G. WEYMOUTH ET AL  1,870,155
GASOLINE METER
Filed April 3, 1929  2 Sheets-Sheet 1
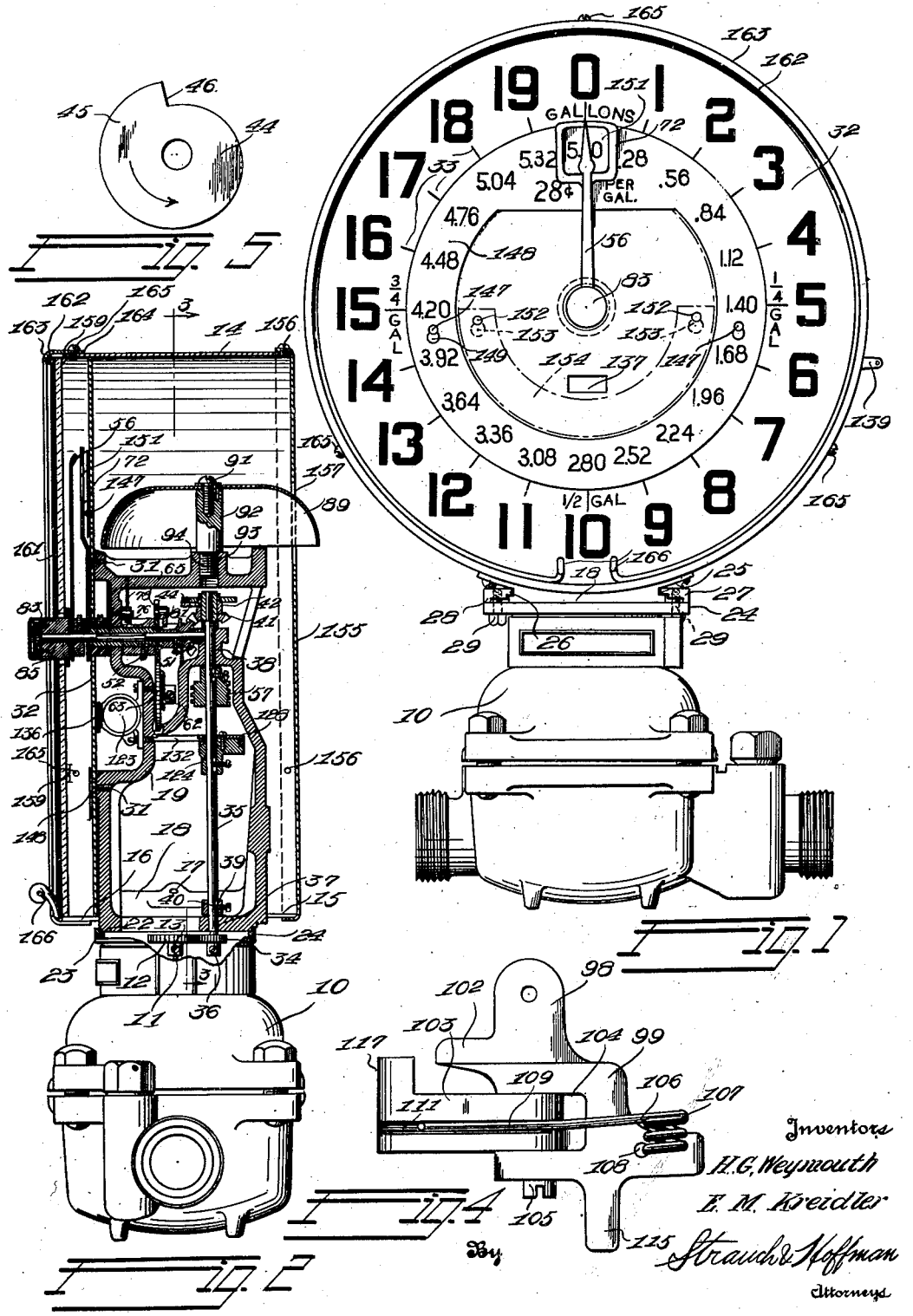

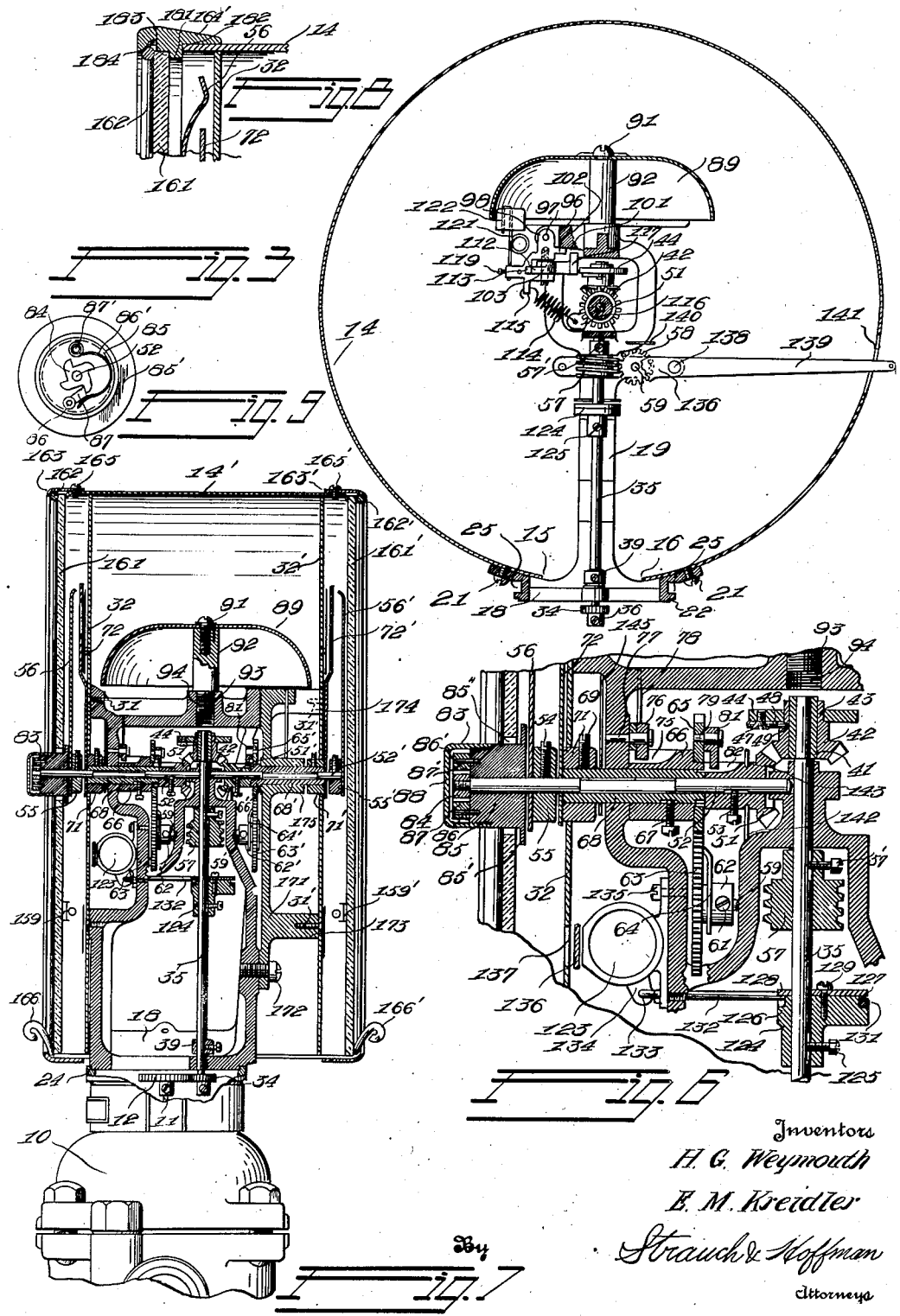

Patented Aug. 2, 1932

1,870,155

UNITED STATES PATENT OFFICE

HARRY G. WEYMOUTH AND EARL M. KREIDLER, OF PITTSBURGH, PENNSYLVANIA, ASSIGNORS TO PITTSBURGH EQUITABLE METER COMPANY, OF PITTSBURGH, PENNSYLVANIA, A CORPORATION OF PENNSYLVANIA

GASOLINE METER

Application filed April 3, 1929. Serial No. 352,283.

This invention relates to a register for a fluid meter especially designed for use in connection with the dispensing of gasoline, although the invention is obviously capable of other uses. The present application is a continuation in part of an application of Harry G. Weymouth and Earl M. Kreidler, Serial Number 249,062 filed January 24, 1928.

A primary object of the invention is to provide an improved and thoroughly practical register for fluid meters for use in dispensing fluid, the operation of which is visibly and audibly indicated so that the purchaser of the metered fluid may be apprised of the quantity that is passing through the meter.

Another object of the invention is the provision of a register having a plurality of visible indicators and an audible indicator all arranged compactly within a casing for the device, the visible indicators and said audible indicator simultaneously apprising the purchaser of each successive unit quantity of fluid delivered.

A still further object of the invention is to provide a fluid register comprising an indicator movable over a dial and adapted to traverse a complete revolution for each unit of fluid metered and which further comprises another indicator that is simultaneously movable over said dial and adapted to traverse only a portion of a revolution for each unit of fluid metered, and which further comprises means whereby the indicators may be readily and accurately reset to their zero position.

A still further object of the invention is to provide a visible fluid meter indicator and register comprising a plurality of synchronously moving indicating and registering elements arranged to be visible from a plurality of opposite directions and which comprises novel means for resetting all of said indicators to their zero positions, which indicator or register may be readily convertible into an instrument readable only from one direction.

A still further object of the invention is to provide a register having a plurality of pairs of indicators arranged such that the indicators of one pair move in synchronism with the indicators of the other pair and which further comprises means for simultaneously resetting said indicators of both of said pairs to their zero position.

A still further object of the present invention is to provide a register for fluid meters comprising a plurality of pairs of indicators simultaneously movable and visible from a plurality of directions and an audible indicator compactly arranged with respect to said plurality of pairs of visible indicators and a casing enclosing said visible indicators and said audible indicator.

A still further object of the invention is to provide a register for fluid meters comprising a mechanism support, said support provided with a dial and indicating hands and adapted for ready attachment or detachment of a second dial and associated indicating hands.

A still further object of the invention is to provide a register for a fluid meter, said register adapted to be secured to said meter by means permitting limited relative rotational movement about the vertical axis of said register and said meter so that the register can be readily made to face in the direction desired by the user.

A still further object of the invention is to provide a register comprising simple means for resetting the indicator hands which means is arranged to prevent tampering with the meter mechanism and to positively prevent the operation of the resetting means in other than the proper direction without imposing the strain incident to attempts to move the indicator hands in the wrong direction on the mechanism of the register.

With the above objects in view as well as others that will appear from the following disclosure reference will be had to the accompanying drawings forming a part thereof and in which:

Figure 1 is a front elevational view of a register constituting one of the embodiments of our invention, illustrated in operative connection with a fluid meter.

Figure 2 is a transverse vertical sectional view of the construction illustrated in Figure 1 with the meter shown in end elevation and partially broken away.

Figure 3 is a vertical sectional view of the register as seen on line 3—3 of Figure 2.

Figure 4 is a side elevational view of a clapper bracket viewed in a direction opposite to that in which it appears in Figure 3.

Figure 5 is a detail plan view of the bell operating cam.

Figure 6 is an enlarged fragmentary section of operating mechanism shown in Figure 2.

Figure 7 is a view similar to Figure 2 disclosing a modification of the invention.

Figure 8 is a fragmentary sectional view showing a modified crystal attaching means.

Figure 9 is an end view of the resetting knob showing the pawl and ratchet mechanism associated therewith.

Referring to the drawings, in which like parts are designated by like reference characters, 10 designates a fluid meter which may be of any desired construction but is preferably of the nutating disk type, the nutations of the disk in operation of the meter imparting rotation to a shaft 11 having a gear 12 detachably secured to the outer end thereof as indicated at 13. Suitable reduction gearing is employed in well known manner to cause movement of gear 12 at a desired rate commensurate with the quantity of fluid passing through the meter.

The improved visible and audible register and indicator is included in a cylindrical casing 14, cut away as shown at 15, providing transversely spaced edges 16 to which are detachably secured ears 17 of a base 18 of a supporting bracket 19 as indicated at 21, (Fig. 3) the gap 15 providing for assembly of casing 14 with the base 18 of bracket 19 disposed externally of the casing, while the portion that supports the operating parts of the register extends through said opening or gap.

The base 18 of bracket 19 includes a circular locating shoulder 22 for seating engagement with a channel 23 formed in a flange 24 attached to the casing of meter 10. Base 18 inwardly of shoulder 22 is provided with two oppositely disposed recesses or grooves 25 whose bottoms are straight. The bottoms of said grooves are parallel and each of the recesses 25 receives a nose 26 (Fig. 1) of a nut 27. Each nut is provided with a spacing lug 28 disposed opposite nose 26. A bolt 29 extends through an aperture in meter flange 24 and is threaded into the body portion of each of the nuts 27 for adjustably drawing the noses 26 into firm engagement with the lower walls of recesses 25 and thereby drawing base 18 into firm engagement with flanges 24 for holding base 18 into immovable engagement with said flange, the nuts tilting on lugs 28, if necessary to bring about such firm engagement.

In mounting meters and registers on gasoline dispensing pumps or other fluid dispensing devices conditions often present themselves which make it difficult if not impossible to have the face of the register disposed at exactly the desired angle with respect to any casing in which it may be mounted upon connecting of the meter in operative position on the conduits or pipes that convey the gasoline to it. A slight adjustment between register and meter is provided by permitting relative rotary movement between base 18 and flange 24. Such adjustment is permitted by the slight spaces between the inner ends of noses 26 and the bottoms of recesses 25 allowing turning movement of base 18 and, consequently, the register face relative to flange 24 about a vertical axis upon loosening bolts 29. When the register is brought so that its faces are brought exactly to the desired position, the bolts 29 are tightened and the base and meter immovably clamped together, the nuts 26 rocking on lugs 28, if necessary, to bring this about as above stated. The gear 34 has a planetary motion around gear 12 during such adjustment.

Bracket 19 extends upwardly within casing 14 providing a support for the entire registering and indicating mechanism about to be described.

Secured to the front face of bracket 19 by screws 31 is a dial 32 provided adjacent the perimeter thereof with a circular series of consecutive numerals, preferably 0 to 19 as indicated in Figure 1 for designating measured units of fluid in a manner hereinafter described. Inwardly of the series of numerals, dial 32 is preferably provided with index lines 33 corresponding to the numerals, and the designations "gallons", "¼ gallon", "½ gallon" and "¾ gallon" are arranged consecutively 90 degrees apart around the dial. The dial 32 is maintained stationary and the indicators about to be described move relatively thereto.

The gear 12 above referred to meshes with gear 34 detachably secured to the inner end of a vertically disposed shaft 35, as indicated at 36. Shaft 35 is journaled for rotation in bracket 19 adajacent the inner and outer ends thereof as indicated at 37 and 38 respectively (Figure 2). An adjustable thrust bearing collar 39 is secured to shaft 35 by screw 40.

Secured to the outer end of shaft 35 is a bushing 41 on which is rotatably mounted a bevel gear or pinion 42. Fixed to the hub 43 of pinion 42 is a cam 44, shown in detail in Figure 5, and which, as indicated, is provided with a projection 45 defining a relatively sharp shoulder 46 for a purpose presently to be described. Secured to the under face of cam 44 as indicated at 47 is one end of a relatively stiff spring wire 48 whose free end extends into a kerf 49 in the hub 43 of pinion 42 and into frictional contact with bushing 41, thus providing a frictional drive connection between shaft 35 and pinion 42 permitting reverse movement of said pinion for a purpose later described.

Bevel pinion 42 meshes with bevel pinion 51 secured to a unit indicator shaft 52 by a set screw 53. Shaft 52 extends through dial 32 and has secured adjacent the outer end thereof by means of a set screw 54 a collar 55 to which the unit indicator hand 56 is secured in any approved manner. A worm 57 is secured to the shaft 35 by a screw 57' in meshing engagement with a worm wheel 58 (Fig. 3) secured to a counter shaft 59 to which a collar 62 is secured by means of a set screw 61. Rotatably mounted on stub shaft 59 is a spur gear 63 to which is secured one end of a looped spring wire 64 in frictional engagement with collar 62 thereby establishing a friction drive between stub shaft 59 and spur gear 63. Gear 63 meshes with a gear 65 fixedly secured to a collar 66 which in turn is secured by a set screw 67 to a sleeve 68 surrounding shaft 52 and to the outer end of which a collar 71 is secured by means of a set screw 69, which collar, as indicated, extends through an aperture disposed centrally of dial 32 and has fixed thereto the indicator hand 72 which moves only a fraction of a revolution for each complete revolution of the unit indicating hand 56. The collar 66 is provided with a recess defining a single tooth 75 arranged to receive the end of a pawl 76 pivotally mounted on frame 19 as indicated at 77, the pawl being maintained in engagement with the periphery of collar 66 by a spring 78 and the tooth 75 being so disposed that the end of pawl 76 will be engaged therewith when both indicator hands 56 and 72 are moved reversely to their zero position, thus preventing reverse movement of the indicator hands in the resetting thereof beyond their zero position.

The gear 65 has pivotally secured thereto at 79 a pawl 81 the end of which is maintained in engagement with the periphery of the hub portion of pinion 51 by a suitable spring and the hub portion is provided with a recess 82 formed to provide a shoulder to be engaged by the end of pawl 81 when pinion 51 is operated in its reverse direction in resetting the indicator hands.

The resetting of the indicator hands is effected by a ratchet mechanism 83 (Figs. 1, 6 and 9) comprising a ratchet wheel 84 threaded on the outer end of shaft 52, said wheel serving to maintain a knob 85 rotatively mounted on shaft 52 between wheel 84 and indicator hand 56. Secured to knob 85 by pin 86 is a pawl member 87 for cooperation with ratchet wheel 84 and maintained in engagement therewith by a spring 86' secured at one end thereof to a pin 87' in knob 85. A cap 88 is threadedly engaged with knob 85 for enclosing the ratchet and pawl members presenting a neat external appearance. The ratchet mechanism is arranged so that knob 85 together with cap 88 can be turned independently of shaft 52 in the direction of indicating operation thereof but imparts rotation to shaft 52 in the opposite or reverse direction for resetting the indicating hands 56 and 72 in a manner hereinafter referred to. Knob 85 is further provided with a flange 85' for preventing the introduction of any manipulating instrument through opening 85'' in the crystal later referred to for tampering with the register mechanism.

In operation of the mechanism so far described, when meter 10 is caused to operate, shaft 35 is set into rotation through meshing gears 12 and 34 which in turn imparts rotation to worm 57 and pinion 42 through the frictional drive connection including spring 48. Pinion 42 imparts rotation to shaft 52 through pinion 51 which shaft imparts rotation to the unit indicating hand 56. Simultaneously with these movements rotation is imparted to stub shaft 59 through worm wheel 58 meshing with worm 57 which through the frictional drive connection including spring 64 and collar 62 imparts rotation to gear 63 which, through meshing engagement with gear 65, imparts rotation to sleeve 68 which imparts rotation to the indicator hand 72. During these operative movements pawl 81 rides in spring pressed engagement over the hub of pinion 51 in a direction opposite to the shoulder defined by recess 82 and pawl 76 rides in spring pressed engagement over the surface of collar 66 in a direction opposite to the shoulder portion of tooth 75, the pawls 81 and 76 thus offering no resistance to the operative movements of pinion 51 and collar 66.

When a required volume of liquid has been dispensed the indicating hands 56 and 72 may be reset to their zero position by turning knob 85 in a counterclockwise direction or opposite to the movement of the indicating hands when in registering operation, which knob through cooperating ratchet and pawl members 84 and 87 imparts rotation to shaft 52, which in turn imparts rotation to pinion 51. As shaft 52 is rotated the unit indicating hand 56 will be rotated therewith and when hand 56 comes in alinement with hand 72 pawl 81 will engage the tooth defined by recess 82 as a result of which the rotation of shaft 52 will be imparted to sleeve 68 through gear 65 and collar 66 which will effect a like rotation of hand 72. When upon continued rotation of shaft 52 through cap 88 hands 56 and 72 reach the zero position pawl 76 will engage tooth 75 thus preventing the reverse movement of hands 56 and 72 beyond the zero position.

The resetting operation just described is permitted by the frictional drives described, which permit rotation of pinion 42 on bushing 41 and rotation of gear 63 on stub shaft 59, the frictional drives permitting relatively free rotation of pinion 42 and gear 63 with respect to bushing 41 and stub shaft 59 operatively associated with driving shaft 35 but clutches 48 and 64 frictionally engage bushing 41 and collar 62 with sufficient spring pressure to effect certain rotation of pinion 42 and gear 63 through bushing 41 and collar 62 upon rotation of shaft 35 in the direction caused by meter 10.

An audible indicator, in the form of a bell 89, is provided, which bell is mounted within the casing and is detachably secured by a screw 91 to a stud 92 provided with a reduced externally threaded shank 93 detachably threaded in a threaded bore 94 in the top of bracket 19 above the register operating mechanism above described. Pivotally secured to a bifurcated lateral projection 96 (Fig. 3) of bracket 19 by means of a pin 97 is an ear 98 of a clapper bracket 99, shown in detail in Figure 4. The bifurcated projection 96 provides a stop shoulder 101 normally engaged by a stop arm 102 carried by bracket 99. Bracket 99 is provided with a laterally yieldable arm 103 pivotally connected within a recess 104 in bracket 99 by means of a vertical pivot pin 105. Arm 103 is normally maintained in parallelism with bracket 99 by means of a spring 106 having a coiled end 107 the tip of which is secured to bracket 99 at 108. Said spring has an extension 109 thereof slidably engaged in a recess 111 in arm 103 urging arm 103 into parallelism with bracket 99 which is limited by engagement of a shoulder 112 on arm 103 with a lug 113 on bracket 99.

Stop arm 102 is normally maintained in engagement with shoulder 101 by means of a spring 114 having one end thereof detachably secured to a lug 115 on bracket 99 and the opposite end thereof detachably secured to a lug 116 carried by bracket 19 thus maintaining the end 117 of arm 103 yieldably in position for engagement by cam 45 in a manner hereinafter referred to. Detachably secured to bracket 99 by a set screw 119 is one end of a spring arm 121 to the outer end of which is secured a bell clapper 122. It will be observed that the bracket 99 is pulled toward cam 44 by a spring, and that the effect of gravity is not substantially relied upon to maintain this bracket in engagement with its operating cam, as heretofore proposed. This results in a smooth operating arrangement actuated with certainty with the same degree of force at each operation.

The operation of the parts just described is as follows:

The end 117 of arm 103 is engaged by the periphery of cam 45 which swings the bracket 99 on its pivot 97 when cam 44 moves in the direction of the arrow shown in Figure 5 and as end 117 reaches shoulder 46 on cam 44, at which time unit indicator hand 56 is in zero position and clapper 122 is in retracted position, bracket 99 is abruptly released upon end 117 of arm 103 jumping from the extreme outer surface of cam 44 to the extreme inner surface thereof at shoulder 46 which causes clapper 122 to strike a blow against the bell 89 in a manner that will be obvious. When the indicator hands 56 and 72 are being reset to their zero position the cam 44 is rotated in a direction reverse to that indicated by the arrow in Figure 5 and the shoulder 46 of the cam engages the forward face of arm 103 viewing Figure 3 causing the arm to swing about the pivot pin 105 in opposition to spring 106 which permits arm 103 to yield thus allowing shoulder 46 to clear the bracket without effecting the operation of the bell. The arm 103 automatically springs to its normal position when the shoulder 46 has passed arm 103 in effecting the resetting of the indicator hands.

A totalizing register 123 may be provided. This is operated by an eccentric 124 detachably secured to shaft 35 by a set screw 125, the eccentric 124 comprising a hub member 126 provided with channel 127 jointly defined by hub member 126 and a disk 128 detachably secured to hub member 126 by a set screw 129. Operatively seated in channel 127 is the circular portion 131 of a crank 132 pivotally secured at 133 to an operating arm 134 of register 123, which register is detachably secured to bracket 19 by screws 135. In order to cover the reading of the totalizing register 123 from ordinary observation a movable shutter 136 is provided adapted to be moved into position across an opening 137 in dial 32. In order to control the movement of shutter 136 it is preferably pivoted on a pin 138 (Fig. 3) suitably secured to bracket 19 and provided with an operating arm 139 projecting outwardly through a slot 141 in casing 14 (Figure 3). A stop 140 is secured to bracket 19 for limiting shutter 136 in its opening position. The totalizing register is driven by shaft 35 that is geared directly to the meter shaft. Accordingly when the meter operates the totalizing register will operate to correctly totalize its operation. In this construction it will be observed that if an attempt is made for fraudulent purposes to turn the meter backward by forcing air therethrough, as has been attempted, the totalizing register will register such reverse movement.

In order to prevent over-running of the register upon the cessation of the passage of fluid through meter 10 shaft 52 and sleeve 68, which respectively operate indicator hands 56 and 72, operate under a constant braking action, the former of which is effected by a stiff spring wire 142 (Fig. 6) secured at one end thereof to bracket 19 and having the free extension thereof engaged in a recess 143 is the hub of pinion 51 under constant spring pressure and the latter is effected by a similar spring wire 145 secured at one end thereof to bracket 19 and having the free extension thereof yieldably engaged with the periphery of sleeve 68.

These yieldable friction engaging wires 142 and 145 engage pinion 51 and sleeve 68 respectively with sufficient spring pressure to stop the moving parts after meter 10 has ceased operation to prevent over-running of the register, but such pressure is not made sufficient to exert any undue pressures tending to prevent the rotation of pinion 51 and sleeve 68 upon rotation of shaft 35 upon the operation of meter 10 or to generate a substantial opposition to the resetting of the indicator hands.

These friction wires are sufficiently stiff, however, to exert a slight braking or a steadying effect on the movable parts to cause the meter parts to move more uniformly during operation without jumping. Obviously the stiffness of the wires 142 and 145 may be varied to give a different retarding action to the meter.

Dial 32 is provided with a plurality of headed studs 147 preferably three in number, an upper central one shown in Figure 2 and two laterally spaced ones symmetrical with the upper central one shown in Figure 1. These studs are adapted to removably maintain a price ring 148 against the outer surface of dial 32, the ring being applied by slipping it over the indicator hands 56 and 72 and bringing the enlarged portions of keyhole slots 149 into registry with studs 147 whereupon ring 148 is moved into engagement with dial 32 and shifted angularly until the shanks of studs 147 move into the reduced portions of keyhole slots 149 thus detachably holding price ring 148 in position.

The price ring 148 as indicated in Figure 1 has a unit price designation thereon at the top thereof and is provided with a circular series of price designations opposite the index lines 33 on dial 32 and consequently the gallon indicating numerals on dial 32 and the price of the indicated number appear in proximity the price designations being the product of the unit price indicated on ring 148 by the gallon designation opposite the successive price designations. Different price rings may readily be substituted when the price of gasoline changes.

As above stated, indicator hand 56 moves throughout an entire revolution for each unit of liquid metered and indicator hand 72 moves from one index line 33 to the next for each unit of liquid metered. As indicated in Figure 1 the outer end of hand 72 is substantially rectangular defining a sight opening 151 of sufficient dimensions to enclose or surround any of the price designations on ring 148, as a consequence of which indicator hand 72 not only clearly indicates the number of gallons purchased as shown by the numerals on dial 32 opposite hand 72, but it also shows total cost of the liquid purchased.

As indicated in Figure 1 dial 32, within ring 148 is provided with oppositely disposed headed studs 152 for detachable engagement within slots 153 of an official State approval plate 154 when such is required.

The rear end of casing 14 is closed by a flanged removable cover plate 155 detachably secured to casing 14 by screws 156 and which may be provided with an opening 157 for the projection therethrough of a portion of bell 89 as indicated in Figure 2.

The front end of casing 14 is slitted and bent inwardly at a plurality of points as indicated at 159 for engagement by the inner face of a crystal 161 maintained in engagement therewith by an annular yieldable member 162 detachably seated within an inturned flange 163 of a ring 164, detachably secured to casing 14 by screws 165. The member 162 is provided with laterally spaced finger engaging extensions 166 whereby the member may be contracted for disengagement from within flange 163 for effecting removal of crystal 161 through the opening within flange 163.

A modified form of the invention is disclosed in Figure 7 embodying a double faced register and indicator. In this form of the invention the construction above disclosed is converted into a double faced register by providing a wider casing 14' and detachably connecting an auxilary bracket, having a dial and indicating hands similar to those above described mounted therein, to the opposite face of bracket 19. Said auxiliary bracket is indicated by 171 and it is detachably secured to bracket 19 by bolts 172. It is provided further with dial supporting ribs 173 and 174 to which a dial 32' similar to dial 32 is secured by screws 31'. Bracket 171 is further provided with a boss 175 in which is rotatably journaled a sleeve 68' similar to sleeve 68 to the outer end of which is secured a collar 71' similar to collar 71 and to which is secured a hand 72' similar to hand 72. A shaft 52', similar to shaft 52, is rotatably journaled in sleeve 68' and has secured on the outer end thereof, by a collar 55' a unit indicating hand 56' similar to hand 56. Secured to shaft 52' adjacent the inner end thereof is a pinion 51' similar to pinion 51 in meshing engagement with pinion 42 whereby rotation is imparted to shafts 52 and 52' upon rotation of shaft 35 in opposite directions for effecting clockwise movement of hands 56 and 56' over the respective dials 32 and 32'. Fixed to a hub of sleeve 66' corresponding to collar 66 is a gear 65' corresponding to gear 65 and having pivotally secured thereto a pawl 81' similar to pawl 81. Meshing with gear 65' is a gear 63' similar to gear 63. Said gear 63' is mounted on a stub shaft 59' and operatively connected thereto by a spring friction drive 64' secured to gear 63' and frictionally engaging a collar 62' fixed to shaft 59'. Shaft 59' is driven by a worm gear similar to gear 58 disposed on the opposite side of worm 57 and in mesh therewith for effecting rotation of gear 63' in an opposite direction to gear 63 and thereby through gear 65' and sleeve 68' imparting rotation to hand 72' in a direction opposite to hand 72 and in the same direction as hand 56'. The dial 32' is covered with a crystal 161' secured in position and designated by the same reference characters primed.

In this form of the invention a single totalizing register 123 is employed and the resetting of the opposite hands is effected by a single rachet mechanism 83 which through pinion 42 effects simultaneous rotation of shafts 52 and 52' in opposite directions and while it is necessary in the resetting operation to provide a pawl 81 and 81' for interconnecting the respective shafts 52 and 52' with sleeve 68 and 68' a single pawl 76 is sufficient for preventing reverse rotation of the indicator hands on dials 32 and 32' beyond their zero position.

It will be observed that the auxiliary bracket 171 has the shaft 52' journaled therein, and that it carries all of the gears by which the motion is transferred from the shaft 35 operated by the meter to the indicating hands that move over the dial 32' and that when the auxiliary bracket 171 is attached to the bracket 19 the bevel gear 51' meshes with the bevel pinion 42 and a worm wheel similar to the worm wheel 58 meshes with the worm 57. Rotation in the proper direction is thus imparted to the indicator that moves through a complete revolution for each unit of the gasoline dispensed, as well as to the indicator that moves through a portion of the revolution for each unit. The arrangement just described, whereby a single dial register may be readily converted into a double dial register by simply attaching thereto a bracket carrying the necessary additional parts, greatly reduces the cost of manufacture of the two types of registers, by making it possible to construct both types of registers with a relatively small number of parts.

It will be observed further that the bracket 19 is formed so that the bell may be secured to the top thereof and the clapper bracket may be pivotally mounted thereon adjacent the shaft 35 so that the clapper bracket may be driven by the meter shaft. By this arrangement all of the parts may be housed within the casing of the register.

The ratchet and pawl mechanism disposed between the knob 85 and the shaft 52 permits the turning of the knob in a direction opposite from that necessary to reset the indicator hand without imposing any strain upon the mechanism of the register. Accordingly, if an inexperienced person in seeking to reset the hands should attempt to turn them in the direction in which they are intended to be driven by the meter when the register is serving its registering function, said person can not impose strains on the registering mechanism, that would tend to damage the mechanism thereof.

The operation of this form of the invention is similar to that above set forth with respect to the first form of the invention and the resetting operations are carried out in a similar manner.

It will be seen that a single bell 89 is sufficient for providing an alarm for the unit indicator hand on either dial and by the provision of a single bell and the lengthening of casing 14 the bell is completely housed within casing 14' centrally of dials 32 and 32'.

It will be seen from the above disclosure that the single faced register can be readily converted into the double faced register and the double faced register as readily converted into the single faced register.

In Figure 8 is disclosed a modification of the invention, wherein a ring 164' is provided and adapted for detachable engagement with the end of casing 14. Ring 164' is provided with an inwardly directed flange 181 defining a shoulder 182 for engagement with the end of casing 14 and an oppositely disposed shoulder 183 for engagement by crystal 161. Ring 164' is provided with a channel 184 adjacent the outer end thereof for the detachable engagement therein of member 162 for holding the crystal in engagement with shoulder 183. By the provision of ring 164' the crystal can be removed as a unit therewith.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range or equivalence of the claims are therefore intended to be embraced therein.

What we claim as new and desire to secure by U. S. Letters Patent is:

1. In a register having a dial, indicators movable over said dial and mechanism to simultaneously move said indicators at different rates of movement over said dial, said mechanism including gears carried by a vertical shaft for respectively driving said indicators, the combination of means to convert said register into a double face register comprising a bracket supporting a second dial, indicators movable over said dial and mechanism to operate said indicators at rates of movement corresponding respectively to the rates of movement of said first named indicators, said bracket being formed so that when it is secured in position the operating mechanism carried thereby will mesh with said gears.

2. In a liquid dispensing apparatus, a liquid meter within a casing having an open top, a vertically arranged shaft within said meter casing and driven by said meter, a gear fixedly mounted on said shaft, a register mechanism within a casing having an open bottom, a vertically arranged shaft in said register mechanism, a gear fixedly mounted thereon and engaged with the gear on said meter shaft, and means connecting the open bottom of said register casing to the open top of said meter casing for relative adjustment about the said meter shaft as an axis, the gear mounted on the register shaft taking a planetary movement about the gear on the meter shaft during such adjustment.

3. A combined meter and register mechanism comprising a meter casing, a shaft driven by the meter mechanism, a register shaft assembly, intermeshing gears on the meter shaft and the register shaft assembly and yieldable friction means engaging a portion of the register shaft assembly to prevent over-running thereof and to exert a slight braking and steadying effect on the movable register shaft assembly.

4. The invention as defined in claim 3 wherein said assembly comprises a register shaft having a sleeve journaled thereon, means for driving said sleeve at a speed different from that of the register shaft, indicating hands on said register shaft and sleeve, and said yieldable friction means being in engagement with said sleeve to prevent overrunning thereof and to exert a slight braking and steadying effect thereon.

5. In a register of the class described, having a main bracket comprising a framework with a dial, indicators, and operating mechanism mounted therein; the combination with supporting means, of means for attaching a supplementary bracket carrying a second dial and indicators, and mechanism for operating said indicators in unison with said first-named indicators.

6. The combination as defined in claim 5, in which said main bracket on its face opposite the dial carried thereby is cut away and in which said supplementary bracket supports a portion of the mechanism carried thereby so that it can project through said cut-away portion and be brought into engagement with the mechanism arranged in said main bracket.

7. The invention as defined in claim 5 wherein said mechanism for operating said indicators includes friction driving means whereby both sets of indicators may be simultaneously reset to zero position.

8. In a register of the class described, having a main bracket, comprising an open frame with a dial, indicators, and operating and resetting mechanism mounted therein; the combination with supporting means, of a supplementary bracket carrying a second dial and indicators, mechanism for operating and resetting the indicators in said supplementary bracket, and means detachably supporting said supplementary bracket from said main bracket with the operating mechanism thereof interconnected with the operating mechanism of said main bracket, whereby said indicators operate in unison, said supplementary bracket and its operating mechanism being removable for converting said register to a single dial register.

9. In a register of the class described comprising a main driving shaft; a unit indicator shaft having an indicating element secured thereto; gearing for driving said unit shaft from said main shaft, including a constantly engaged friction drive; a sleeve supported by said unit shaft having an indicating element secured thereto; a reduction gearing drive connecting said sleeve and said main driving shaft including a constantly engaged friction drive; a set-back mechanism for said unit shaft having a one-way clutch engageable to reset said shaft but freed therefrom if said mechanism is operated in registering direction; and means to operatively connect said sleeve and unit shaft for simultaneous rotation during resetting.

10. In a register of the class described having a main bracket, a main driving shaft, two dials, and a unit indicator and a multiple indicator movable over each dial; the combination of separate unit shafts carrying said unit indicators; gearing connecting each unit shaft with said main shaft including a constantly engaged friction drive; separate sleeves carrying said multiple indicators and supported by said unit shafts; reduction gearing connecting said sleeves with said main driving shaft including a constantly engaged friction drive; a set-back knob on one unit shaft having a one-way ratchet engageable to reset both said unit shafts but freed therefrom if said knob is rotated in registering direction; and means to operatively connect each sleeve with its unit shaft for simultaneous rotation during resetting.

11. The invention as defined in claim 10 wherein one dial and its indicators, unit shaft, and sleeve are carried by a supplementary bracket, and means for attaching said supplementary bracket to said main bracket with its unit shaft and sleeve operably connected to drive the indicators mounted thereon.

12. In a register of the class described comprising a main driving shaft; a unit indicator shaft having an indicating element secured thereto; mechanism for driving said unit shaft from said main shaft, including a constantly engaged friction drive which has sufficient strength to positively couple said shafts for registering movement but which will yield to permit independent reverse rotation of the unit shaft; a sleeve supported by said unit shaft having an indicating element rotatable therewith; reduction mechanism for driving said sleeve at a fraction of the speed of the unit shaft; a setback mechanism for said unit shaft having a one-way clutch engageable to reset said shaft but freed therefrom if said mechanism is operated in registering direction; and means to operatively connect said sleeve and unit shaft for simultaneous rotation during resetting.

13. In the combination defined in claim 12, said constantly engaged friction drive comprising the sole yielding connection between said main and unit shafts; and said reduction mechanism embodying means permitting reverse movement of both indicating elements at the same speed after said sleeve and unit shaft have been operatively connected during the resetting operation.

14. In a register of the class described, comprising a framework in combination with an encased dial; a main driving shaft journaled in said framework; an indicator shaft coupled to said driving shaft, said indicator shaft being journaled in said frame-work for projection through said dial and carrying an indicating hand for cooperation with the latter: a resetting mechanism for said indicating hand, said mechanism being directly connected to said rotatable indicator shaft for positively engaging and rotating the latter in reverse direction and designed to be freely disengaged to prevent manual actuation of said indicator shaft in registering direction; and the coupling between said shafts embodying a frictional connection permitting independent reverse movement of said indicator shaft relative to said main shaft during the resetting operation.

In testimony whereof we affix our signatures.

HARRY G. WEYMOUTH.
EARL M. KREIDLER.